(12) United States Patent
Detela

(10) Patent No.: US 6,700,271 B2
(45) Date of Patent: Mar. 2, 2004

(54) HYBRID SYNCHRONOUS MOTOR EQUIPPED WITH TOROIDAL WINDING

(75) Inventor: Andrej Detela, Ljubljana (SI)

(73) Assignee: Harmonic Drive Systems, Inc., Tokyo (JP)

(*) Notice: Subject to any disclaimer, the term of this patent is extended or adjusted under 35 U.S.C. 154(b) by 0 days.

(21) Appl. No.: 09/914,214

(22) PCT Filed: Jan. 10, 2001

(86) PCT No.: PCT/JP01/00070
§ 371 (c)(1),
(2), (4) Date: Sep. 27, 2001

(87) PCT Pub. No.: WO01/52388
PCT Pub. Date: Jul. 19, 2001

(65) Prior Publication Data
US 2002/0125775 A1 Sep. 12, 2002

(30) Foreign Application Priority Data
Jan. 14, 2000 (SI) .......................... P-200000004

(51) Int. Cl.[7] .............................................. H02K 19/00
(52) U.S. Cl. ........................ 310/164; 310/180; 310/216; 310/254
(58) Field of Search .................................. 310/164, 180, 310/216, 266, 114, 263, 258, 43, 54, 58

(56) References Cited

U.S. PATENT DOCUMENTS

| | | | | |
|---|---|---|---|---|
| 4,217,508 A | * | 8/1980 | Uzuka | .......................... 310/46 |
| 4,398,108 A | * | 8/1983 | Danilevich et al. | ............. 310/54 |
| 4,731,554 A | * | 3/1988 | Hall et al. | ................. 310/67 R |
| 5,111,098 A | * | 5/1992 | Peck et al. | .................... 310/268 |
| 5,304,883 A | * | 4/1994 | Denk | .......................... 310/180 |
| 5,977,679 A | * | 11/1999 | Miller et al. | ................. 310/164 |
| 6,175,178 B1 | * | 1/2001 | Tupper et al. | ............... 310/166 |
| 6,177,746 B1 | * | 1/2001 | Tupper et al. | ............... 310/166 |
| 6,411,005 B1 | * | 6/2002 | Strangas et al. | ............. 310/254 |

FOREIGN PATENT DOCUMENTS

| | | |
|---|---|---|
| JP | 63-103648 | 5/1988 |
| JP | 1-61879 | 3/1989 |
| JP | 09-182405 | 7/1997 |

* cited by examiner

*Primary Examiner*—Thanh Lam
(74) *Attorney, Agent, or Firm*—Burns, Doane, Swecker & Mathis, L.L.P.

(57) ABSTRACT

A hybrid synchronous motor comprising a rotor and stators, wherein the stator has at least one assembly (7) having a structure in which ferromagnetic rings (2, 3) formed with cogs on the both inner and outer circumferences thereof, are arranged coaxially, and a coil winding (8) is wound on the assembly (7) so as to be positioned between cogs. The hybrid synchronous motor exhibits a high magnetic flux density in the air gap as the result of transverse magnetic flux of the permanent magnets combined with longitudinal magnetic flux of the coils and high active surface at the air gap due to double (inner and outer) air gaps. Further, since it contains only a single set of stator coils and it has merely a small number of assembling parts and conventional techniques of fabrication may be applied, the motor is cheap in construction. Furthermore, the motor exhibits an excellent energy efficiency due to only small ohmic losses in the coils.

7 Claims, 9 Drawing Sheets

HYBRID SYNCHRONOUS MOTOR EQUIPPED WITH TOROIDAL WINDING

FIELD OF THE INVENTION

The present invention relates to a hybrid synchronous motor with toroidal winding. In particular, the present invention pertains to a hybrid synchronous motor having a structure that can provides higher torque per machine weight as compared to conventional motors with similar construction.

BACKGROUND OF THE INVENTION

Hybrid electric machines are stepper motors with in-built permanent magnets that increase magnetic field density in the air gap. Special constructions of such motors are already known. One such construction exhibits cogged iron rings in both the stator and the rotor wherein the stator coils are wound like in many other stepper motors and are typically three-phase. Further, strong permanent magnets in the form of discs are inserted in between iron sheets (lamellae) of the stator and magnetized in the axial direction in such a way that magnetic flux of the permanent magnets passes across the iron sheets while the magnetic flux of the coils goes along the sheets in the longitudinal direction. With such a construction, a relatively high magnetic flux density may be obtained in the air gap, and hence, high torque per machine weight.

According to another construction, the motors are provided with a double air gap between the rotor and stator, i.e. an inner air gap and an outer air gap. They have a rotor ring with cogs on both the inner and the outer circumference and contain two stator rings, an inner and an outer one. Each of these two stator rings is in its construction similar to the construction described above so that the number of coils is doubled, and concurrently the number of permanent magnets.

The motors according to the above described constructional solutions have a relatively good torque per weight. The second construction described above gives double torque because the active surface at the air gap is also doubled. Yet this embodiment harbors the shortcoming in that the motor needs a double number of stator coils and a double number of stator permanent magnets with the result that ohmic losses in the coils are also doubled. Consequently, there was a need in the art for additional hybrid synchronous motors having a high torque per weight, yet avoiding the disadvantages of the prior art.

DISCLOSURE OF THE INVENTION

An object of the present invention resides therefore in providing a hybrid synchronous motor with double (inner and outer) air gaps, which is able to generate a high density magnetic field in the air gap by combining the transverse magnetic flux of permanent magnets and the longitudinal magnetic flux of stator coils.

In order to realize the above object, according to the present invention, there is provided a hybrid synchronous motor with toroidal winding comprising a rotor and a stator, the stator comprising of at least one assembly of coaxially displaced ferromagnetic rings which are cogged both on inner and outer circumferences thereof, the assembly being provided with a polyphase toroidal coil made of coil segments so that the coil wire is lying between cogs.

The hybrid synchronous motor according to the present invention exhibits a high magnetic flux density in the air gap as the result of transverse magnetic flux of the permanent magnets combined with longitudinal magnetic flux of the coils and high active surface at the air gap due to double (inner and outer) air gaps, yet contains only a single set of stator coils. Since merely a small number of assembling parts and conventional techniques of fabrication may be applied, the motor is cheap in construction. Further, the motor exhibits an excellent energy efficiency due to only small ohmic losses in the coils.

More specifically, a hybrid synchronous motor with toroidal winding according to the present invention is characterized in that it comprises a rotor and a stator, the stator having at least one assembly (7) of coaxially displaced ferromagnetic rings (2, 3) which are cogged both on inner and outer circumferences thereof, and the assembly (7) being provided with a polyphase toroidal coil (6) made of coil segments so that a coil wire is lying between cogs (2a, 3a, 2b, 3b).

In the present invention, it is also characterized in that a plurality of the stator assemblies (7) have a common toroidal coil which is formed around all of them simultaneously, and wherein the common toroidal coil is wound around or assembled from U-shaped copper parts.

Further, in the present invention, it is characterized in that one pair of inner and outer rotor assemblies (16a, 16b) is mounted to each stator assembly (7), each stator assembly including two coaxially displaced rotor rings (17a, 18a or 17b, 18b), each rotor ring is being formed with rotor poles in the form of cogs which are equally spaced along a circumferential direction, so that the poles of each of the rotor rings (17a, 17b) are angularly shifted for one half of rotor pole division relative to the poles of the other corresponding one of the rotor rings (18a, 18b), respectively.

Furthermore, in the present invention, it is characterized in that either one axially magnetized disk is inserted between the cogged stator rings (2, 3) of each assembly (7), or two such disks are inserted between the adjacent cogged rotor rings (17a, 18a) and (17b, 18b), and wherein the disk or the disks are producing transverse magnetic flux in the inner and in the outer air gaps between the rotor and stator.

In addition, in the present invention, it is characterized in that four sets of rotor poles (19a, 19b, 20a, 20b) have the same number of poles, and four sets of stator poles (2a, 3b, 3a, 3b) also have the same number of poles, but these two numbers slightly differ if the stator poles are equally spaced along a circumferential direction.

While, in the present invention, it is characterized in that the gaps between rotor and stator are filled with a liquid, preferably ferromagnetic liquid which improves heat transport from motor interior and reduces mechanical vibrations.

BEST MODE FOR CARRYING OUT THE INVENTION

With reference to the drawings, the present invention will now be described in detail.

Figure 1:
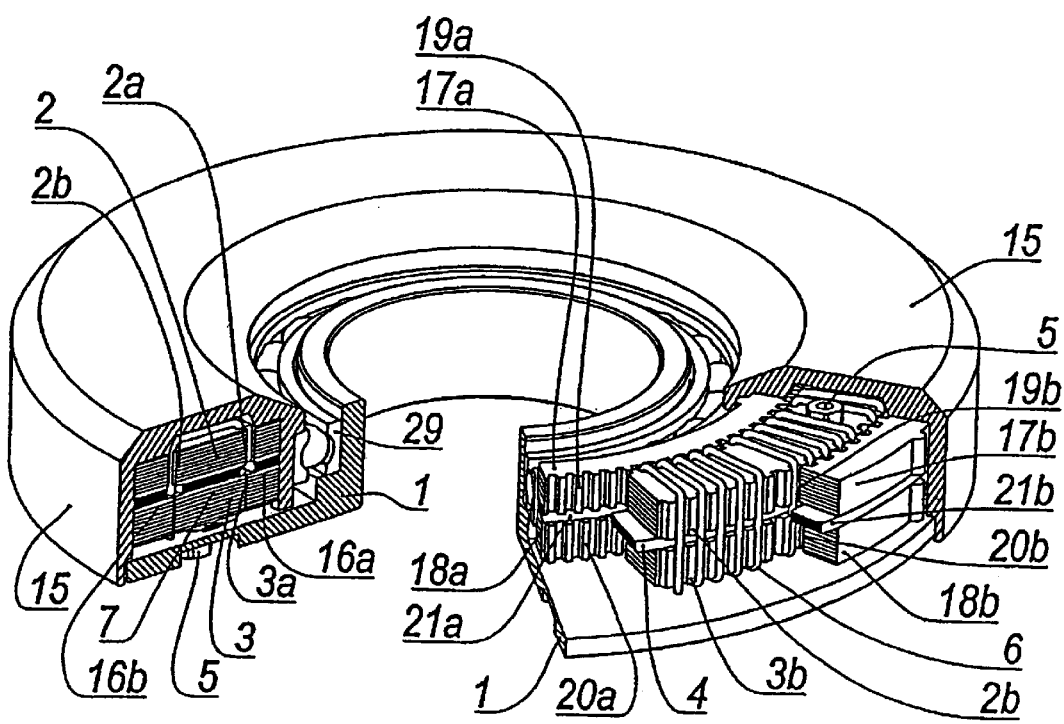
FIG. 1 is a perspective view of a three-phase hybrid synchronous motor with toroidal winding according to the invention, in partial cross-section.
Figure 2:
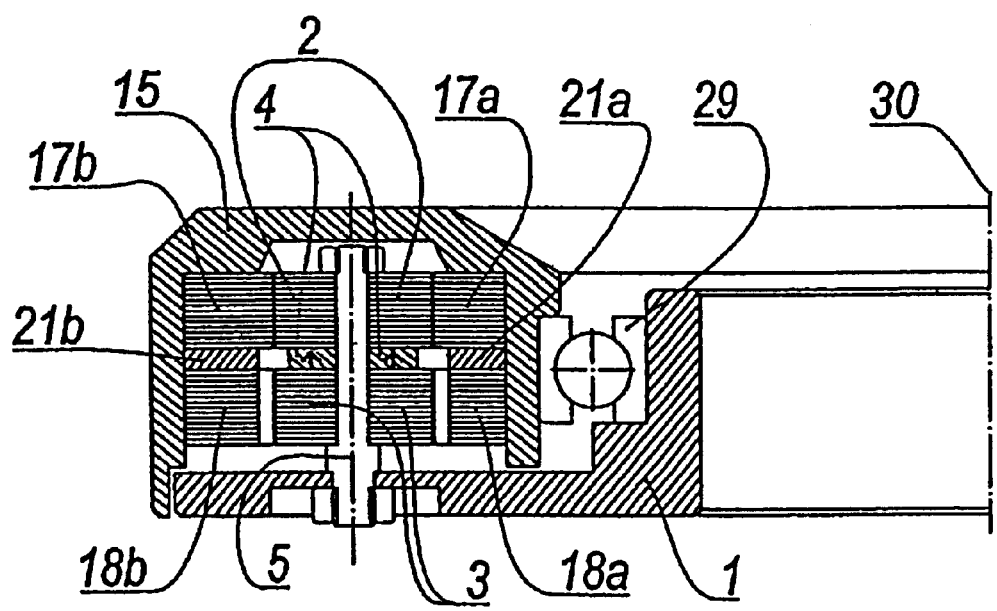
FIG. 2 shows a cross-section of Example A of the motor assembly according to the invention.
Figure 3:
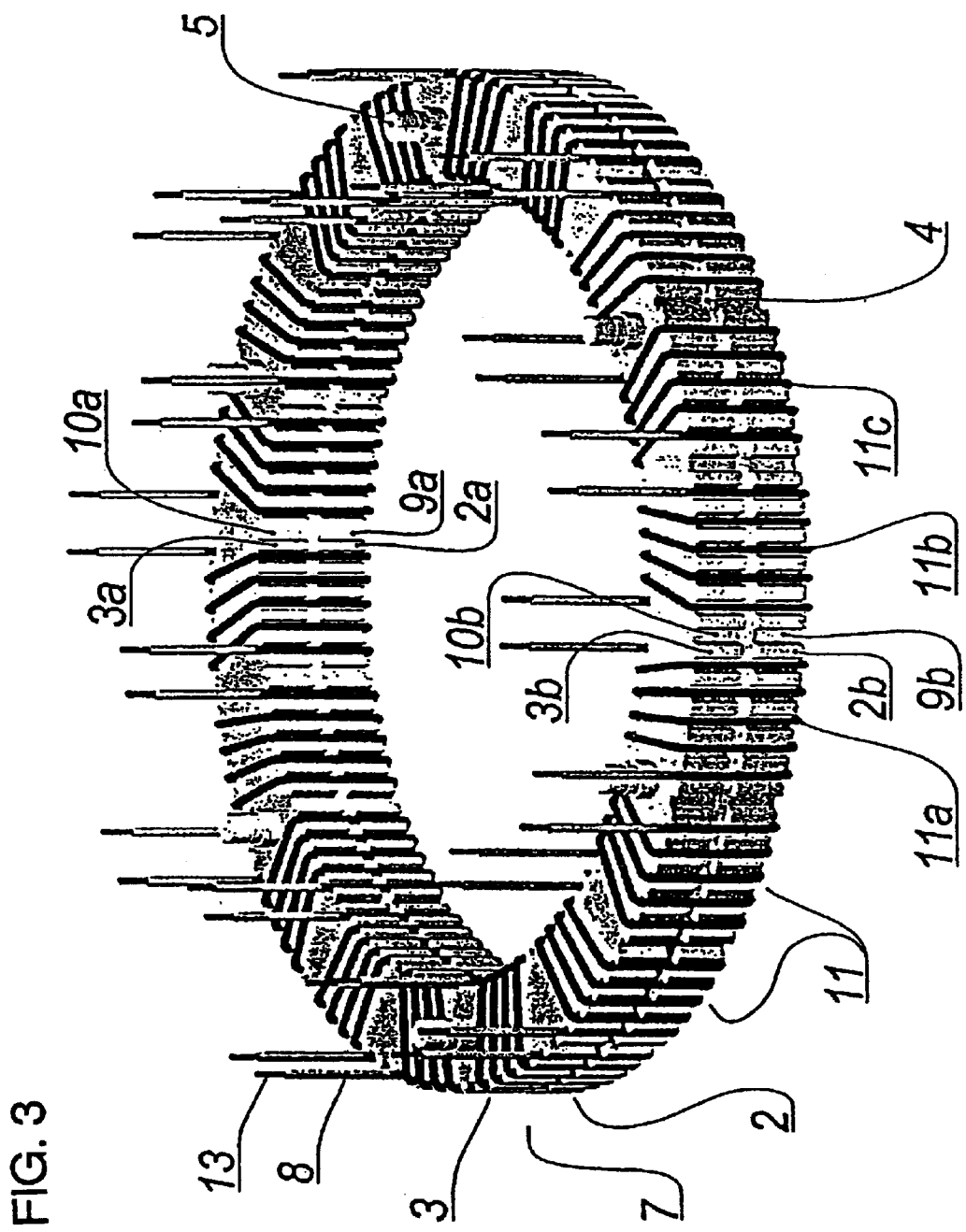
FIG. 3 is a perspective view of a three-phase toroidal winding, with electrical connections for three phases (A, B, C) of current source.

FIGS. 1 and 2 show a first embodiment (Example A) of a hybrid synchronous motor with toroidal winding according to the invention, and FIG. 3 shows more precisely the vital components of the stator thereof. To one side of a stator armature 1 of this motor at least one assembly 7 is fixed. Each assembly has two cogged rings 2, 3 of ferromagnetic material fitted with stator poles 2a, 2b, 3a, 3b and a magnetized disk 4. The cogged rings 2, 3 and the magnetized disk 4 can be held together by means of screws 5, as shown in FIGS. 1 and 3. The cogged rings 2, 3 in the assembly are placed such that their outer poles 2b, 3b are in the same angular position, as is shown in FIGS. 1 and 3. The same applies to the inner poles 2a, 3a. The disk 4 is magnetized so as to produce a magnetic flux that can be directed either from the cogged ring 2 to the cogged ring 3 or in the opposite direction. Each cogged ring 2, 3 can be made of silicon iron laminations by standard producing techniques, like in conventional motors.

A stator coil 6 is wound toroidally around the stator assembly 7, so that wire 8 of the coil 6 encircles many times the stator assembly 7 in a way very similar to the winding of toroidal transformers. The wire 8 follows the gaps 9a, 9b, 10a, 10b between the stator poles 2a, 2b, 3a, 3b, respectively and fills them in such a way that the wire 8 is nowhere protruding out of the gaps. In each one of the four gaps 9a, 9b, 10a, 10b, one to several turns of the wire 8 may be lying.

Figure 4:
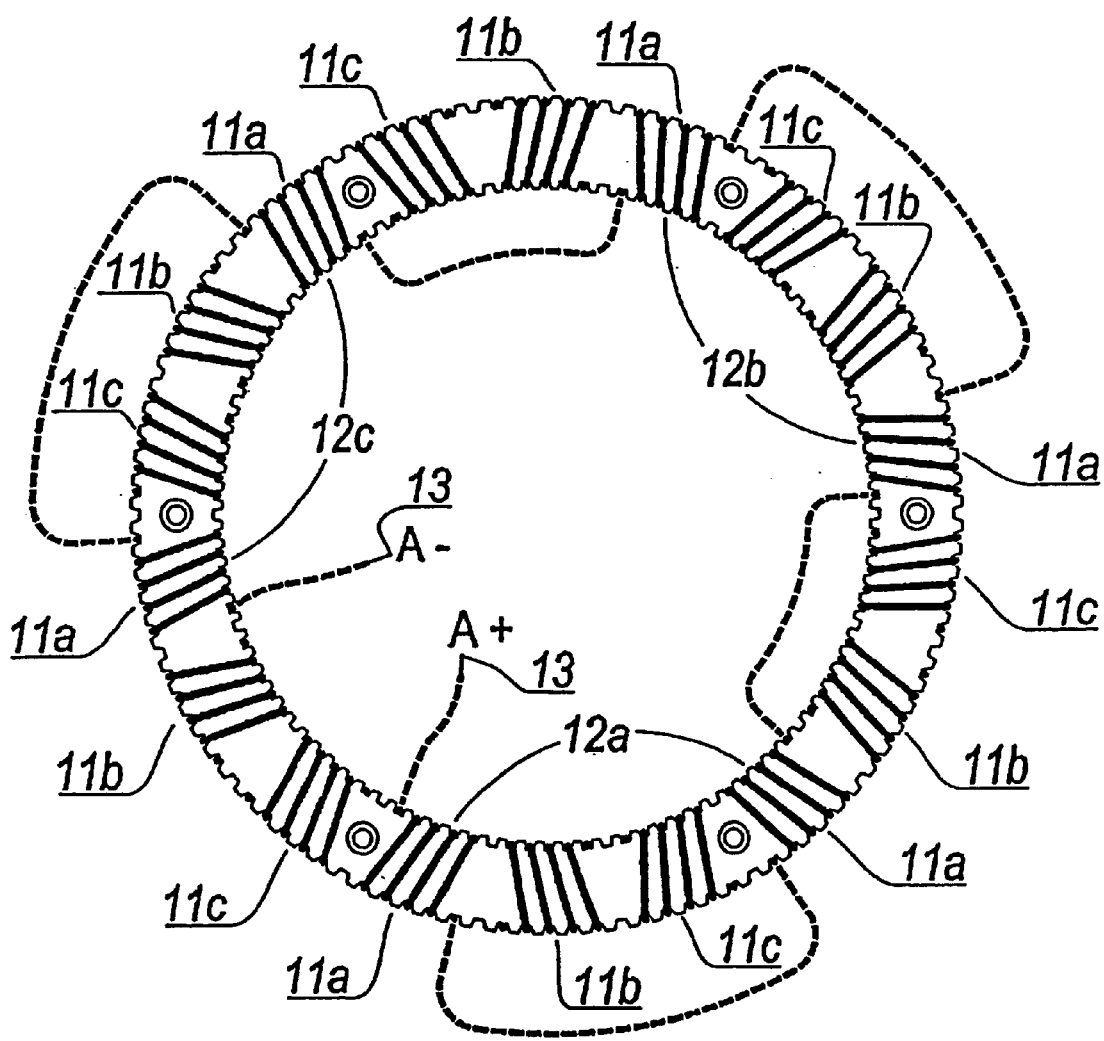
FIG. 4 is a side view (the side with electrical connections) when seeing along a longitudinal direction of the three-phase toroidal winding of FIG. 3.
Figure 5:
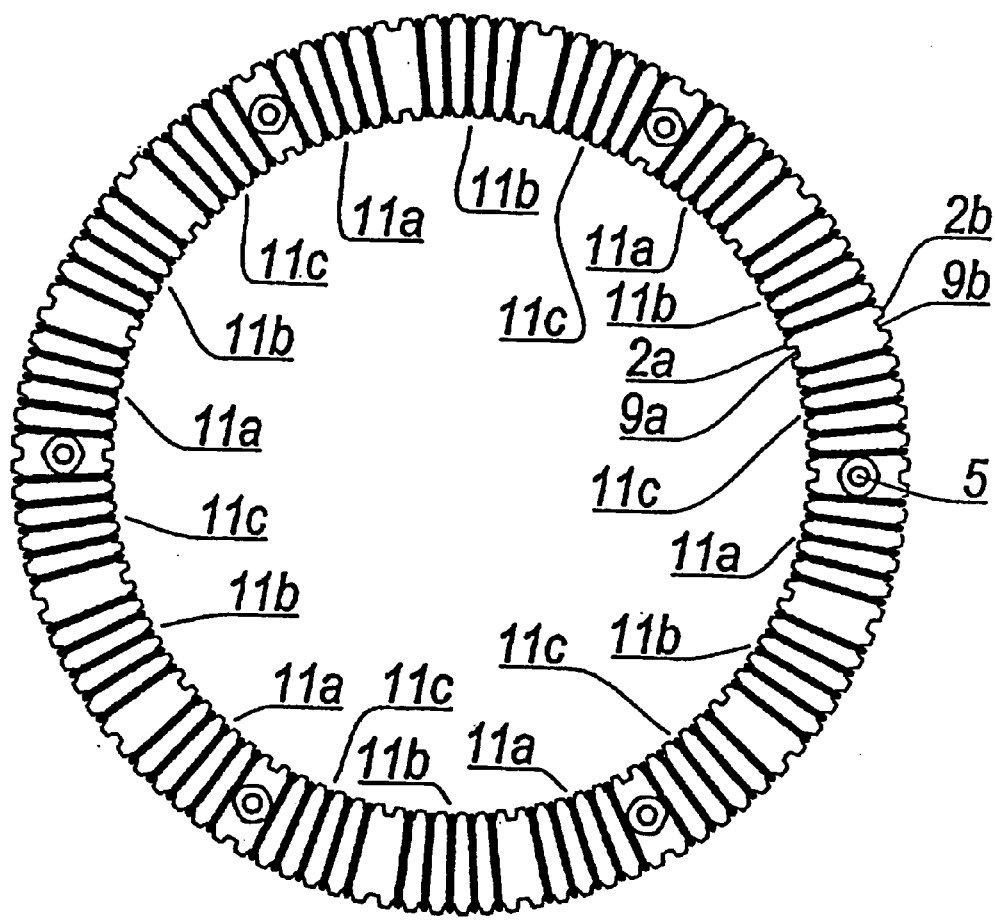
FIG. 5 is a side view (the side without electrical connections) when seeing along a longitudinal direction of the three-phase toroidal winding of FIG. 3.

The stator coil 6 is, all along the circumference of the assembly 7, divided into equal segments 11. Each segment 11 is connected to one of the phases of a polyphase electric current, so that the successive segments 11 are connected to the successive electric phases. In FIGS. 3, 4 and 5, examples of a three-phase winding are shown. The six segments 11a corresponding to the first phase (phase A) can be electrically connected in series as is shown in FIG. 4, and so can also the six segments 11b corresponding to the second phase, and also the six segments 11c corresponding to the third phase.

Let us take the six segments 11a. It may be seen that they can be divided into three pairs(12a, 12b, 12c. In each of these pairs there is one segment with wire 8 encircling the stator assembly in the positive direction and one segment with wire 8 encircling the stator assembly in the negative direction. If the number of pairs is designated L, then L=3 for the cases shown in FIGS. 3, 4 and 5.

The ends of the polyphase coil 6 lead through the stator armature 1 to electric contacts 13 with a polyphase current source. The pair of contacts for the phase A in FIG. 4 is designated A+/A−.

To a rotor armature 15 which is connected to the stator armature via a ball bearing 29, an inner rotor assembly 16a and an outer rotor assembly 16b are fixed. The inner rotor assembly 16a consists of two cogged rings 17a, 18a of ferromagnetic material fitted with equally spaced rotor poles 19a, 20a and a ferromagnetic disk 21a. Similarly, also the outer rotor assembly 16b consists of two cogged rings 17b, 18b of ferromagnetic material fitted with equally spaced rotor poles 19b, 20b and a ferromagnetic disk 21b.

The cogged rings 17a, 18a and the ferromagnetic disk 21a can be held together by being firmly pressed into the rotor armature 15, as is shown in FIG. 1. The cogged rings 17a, 18a in the assembly 16a are placed such that their poles 19a, 20a are mutually shifted, as shown in FIGS. 1 and 2. Each of the cogged rings 17a, 18a can be made of silicon iron laminations by standard producing techniques, like in conventional motors. All the above segments apply also to the outer rotor assembly 16b, respectively.

Relative axial position of all rotor and stator rings is shown in FIG. 2, where a central axis of the motor is marked with a reference numeral 30. The stator ring 2 is in the magnetic juncture with the rotor rings 17a, 17b and the stator ring 3 is in the magnetic juncture with the rotor rings 18a, 18b. The electrical conductors are not shown in this picture.

The four sets of rotor poles 19a, 19b, 20a, 20b have the same number of poles (let us call this number Kr). The four sets of stator poles 2a, 2b, 3a, 3b also have the same number of poles (let us call this number Ks). In the case that the stator poles are, like the rotor poles, also equally spaced (as is the case in the examples according to FIGS. 1–4), then the numbers Ks and Kr should not be equal; the difference is exactly the above mentioned number L.

Figure 6:
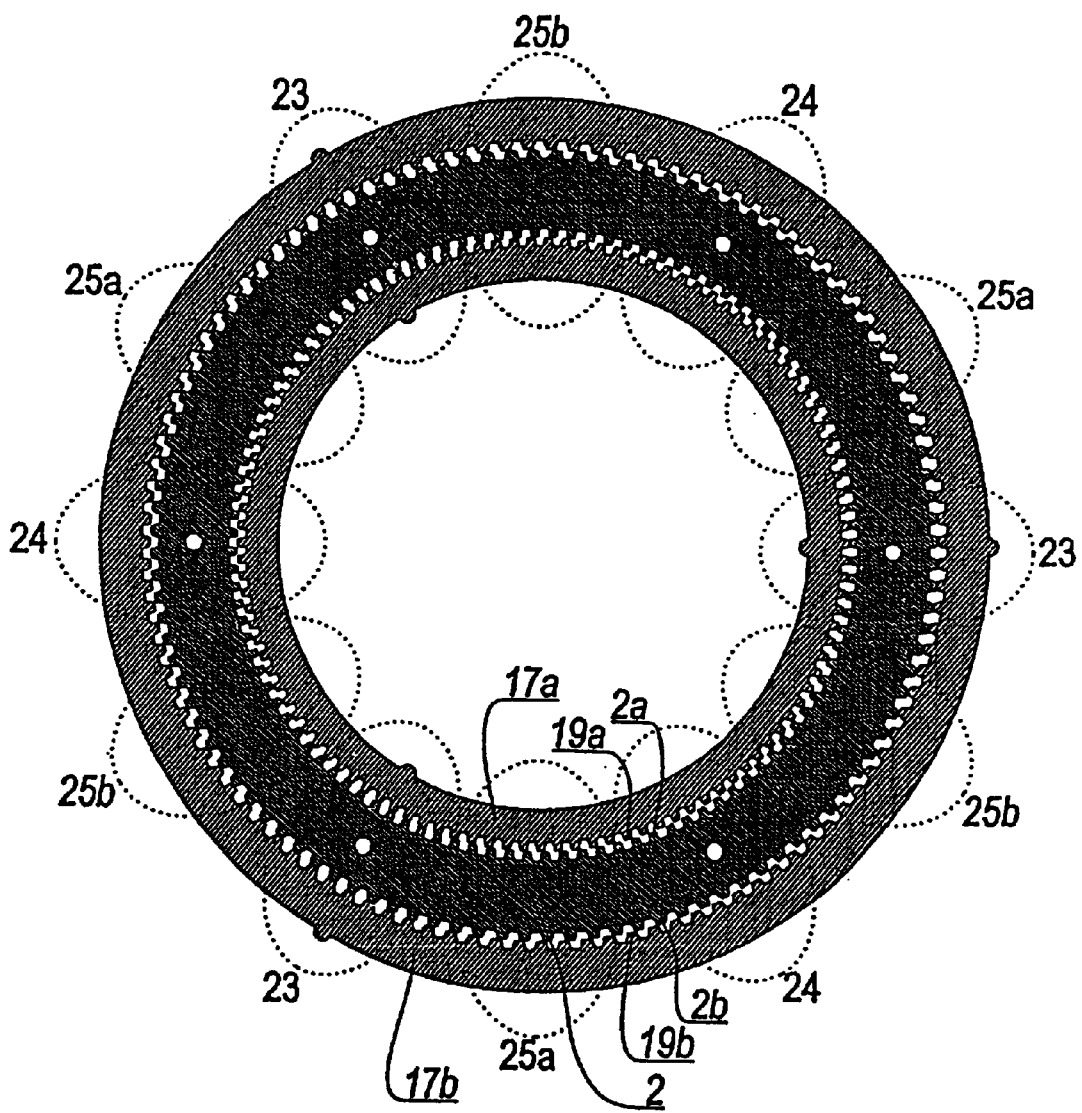
FIG. 6 is a sectional view, showing relative position of cogged iron rings of rotor and stator (Examples A and B).

FIG. 6 shows the relative position of stator poles 2a, 2b and rotor poles 19a, 19b at a chosen moment of observation, at one definite longitudinal section through the rotor rings 17a, 17b and through the stator ring 2. Due to the difference between Kr and Ks (this difference is designated with L), around the circumference there are L regions (in the present case L=3) where the rotor and stator poles coincide and L regions where theses poles do not coincide. Between the regions of coincidence 23 and the regions of non-coincidence 24, there are regions of partial coincidence 25a, 25b where the rotor poles (19a, 19b are slightly shifted relative to the stator poles 2a, 2b. In successive regions of partial coincidence they are shifted alternatively either clockwise or counter-clockwise, so that in the regions 25a the rotor poles are shifted clockwise and in the regions 25b they are shifted counter-clockwise.

Referring still to FIG. 6 and FIG. 1, the magnetic field in the air gap between the stator ring 2 and the inner rotor ring 17a is produced partially by the present magnet 4 and partially by the coil 6. The same applies to the air gap between the stator ring 2 and the outer rotor ring 17b. That component of the magnetic field which is produced by the coil, varies along the air gap circumference. By proper adjustment of the electric phases of the three-phase currents in the coil segments 11, it is possible that any chosen moment of observation, the magnetic field in the air gap between the stator ring 2 and the inner rotor ring 17a is strongest just in the regions 25b. The same applies for the magnetic field in the air gap between the stator ring 2 and the outer rotor ring 17b.

Because of such momentous magnetic state, the stator poles 2a, 2b attract the rotor poles 19a, 19b in a clockwise direction. This causes the rotor to move clockwise and as soon as it makes a small fraction of revolution in clockwise direction, the regions of partial coincidence 25b shift considerably along the circumference (also in the clockwise direction, if Kr is grater than Ks which is the case according to FIG. 6).

In this new moment, it may be achieved that by the change of the electric phases of the three-phase currents, the magnetic field in the air gap between the stator ring 2 and the inner rotor ring 17a is again strongest just in the new regions 25b. The same applies for the magnetic field in the air gap between stator ring 2 and outer rotor ring 17b. Very similar picture holds also for another half of the active motor parts, namely for the stator ring 3 and the rotor rings 18a, 18b.

In this way the rotor continues to move. During one cycle of the three-phase electric current in the coil 6, the rotor turns for one rotor pole division forwards. The continuous change of the electric phases of the three-phase currents can be provided by electric commutation.

It will acknowledged that more than two or more stator assemblies 7 may be fixed coaxially to the stator armature 1, and in this case the stator coil 6 may be wound around all of them simultaneously. This applies even for stator assemblies 7 fixed to different sides of the stator armature 1.

Figure 7:
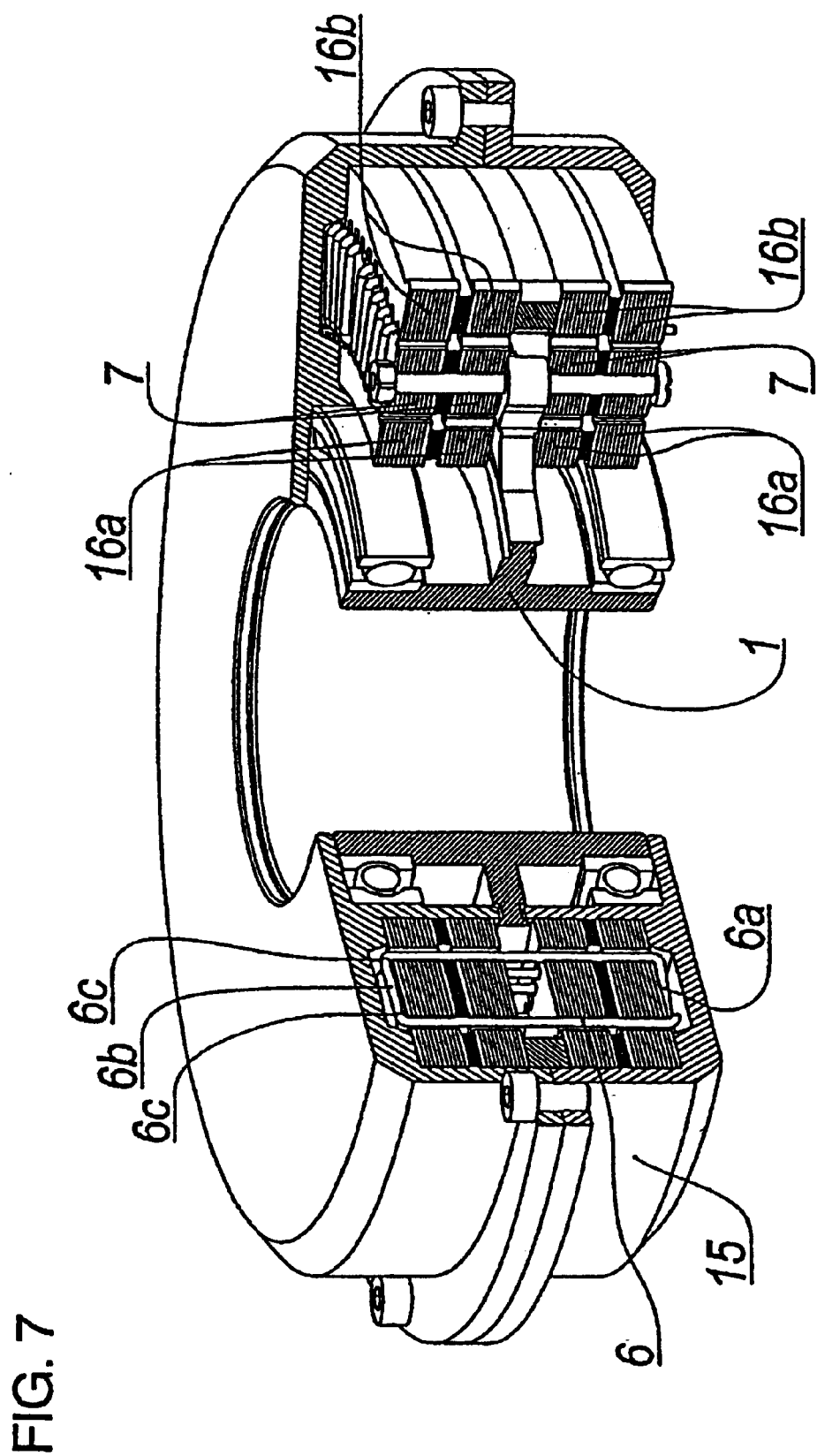
FIG. 7 is a perspective view of a hybrid synchronous motor with double stator assembly and common toroidal winding according to the invention, in partial cross-section.

FIG. 7 shows the stator of such a motor, in which two stator assemblies 7 are fixed to the stator armature 1, one from each side, and they both have a common winding 6. In any case, the number of rotor assemblies 16a, 16b equals the number of stator assemblies 7. For the sake of easy fabrication, the unbroken wire of the coil 6 can sometimes be replaced by separate turns of the coil. One such case is shown in FIG. 7, where each single turn consists of one U-shaped copper part 6a and one shorter copper part 6b, soldered or welded together at points 6c.

Figure 8:
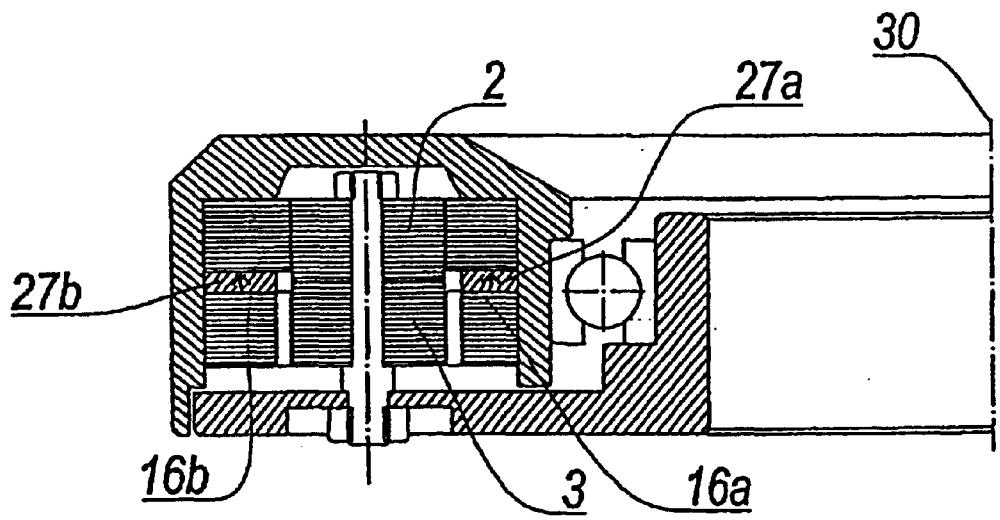
FIG. 8 is a sectional view showing a rotor assembly of a hybrid synchronous motor with toroidal winding of Example B according to the invention.

In FIG. 8, another embodiment (Example B) of the hybrid synchronous motor with toroidal winding according to the invention in shown. (Again, electrical conductors are not shown.) Nearly everything is identical to Example A, with the proviso of the following exceptions. The magnetized disk 4 in the stator is omitted so that two cogged rings 2, 3 are closed together, touching each other (or fused together). Two ferromagnetic disks 21a, 21b are replaced by two magnetized disks 27a, 27b, which are both magnetized in the same axial direction, like the arrows in FIG. 8 indicate. Therefore, in Example B the permanent magnets are in the rotor.

Figure 9:
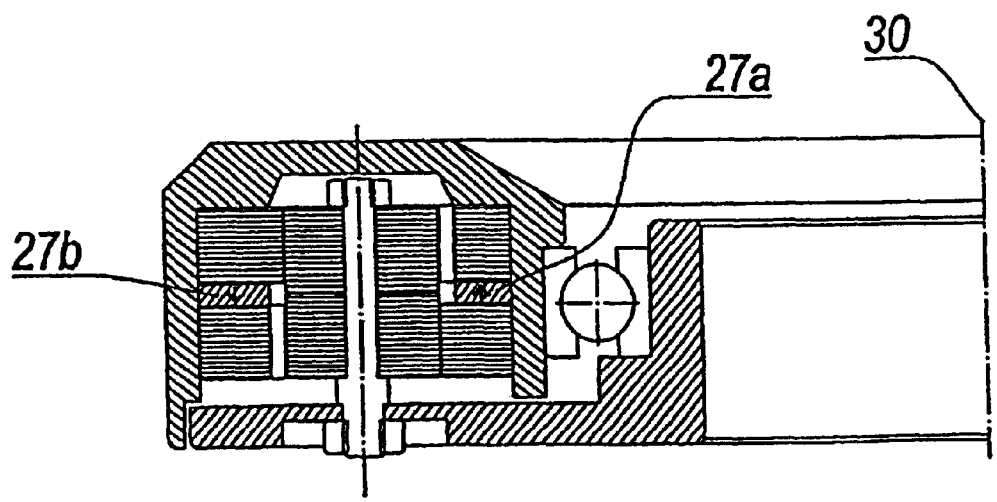
FIG. 9 is a sectional view showing a rotor assembly of a hybrid synchronous motor with toroidal winding of Example C according to the invention.
Figure 10:
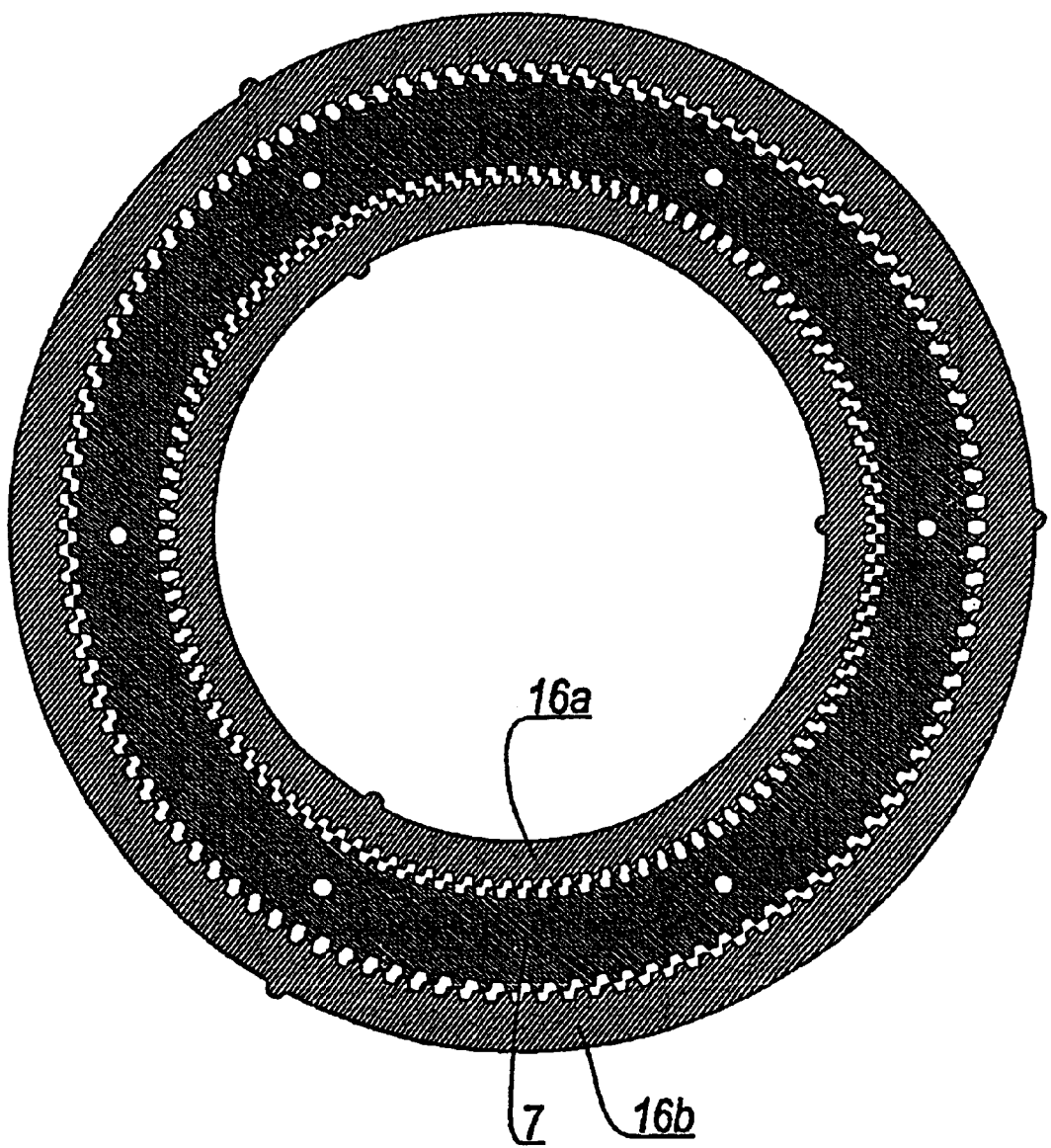
FIG. 10 is a sectional view of Example C, showing relative position of cogged iron rings of rotor and stator.

In FIG. 9 still another embodiment (Example C) of the hybrid synchronous motor with toroidal winding according to the invention is shown (again, without electrical conductors). It also has the permanent magnets in the rotor and is nearly identical to Example B, with the following exceptions. Two disks 27a, 27b are magnetized in the opposite direction, as the arrows in FIG. 9 indicate. The inner rotor assembly 16a is, relative to the outer rotor assembly 16b, angularly shifted around the motor axis for one half of rotor pole division. Thus, the configuration for longitudinal section of relative position of rotor and stator poles in Example C is obtained as shown in FIG. 10, which slightly differs from the relative position of Example B (see FIG. 6).

The thermal contact between the coil 6 and the motor housing 1, 15, which is often low in motors with toroidal configuration of the coils, can be considerably improved by filling the inner and the outer gap between rotor and stator with a liquid that has different functions. It is leading all the excessive heat from the motor interior and, at the same time, it is damping all the undesirable mechanical vibrations.

For this purpose, a special ferromagnetic liquid, which is kept trapped into the gap simply by the magnetic field between rotor and stator, may be used. Examples of ferromagnetic liquids are various stable suspensions of monodomain magnetic particles in a non-magnetic liquid carrier. The particles with an average size of about 10 nanometers are coated with a stabilizing dispersing agent which prevents particle agglomeration even a strong magnetic field gradient is applied to the ferrofluid.

Industrial Applicability

As is explained above, the hybrid synchronous motor according to the present invention exhibits a high magnetic flux density in the air gap as the result of transverse magnetic flux of the permanent magnets combined with longitudinal magnetic flux of the coils and high active surface at the air gap due to double (inner and outer) air gaps. Further, since it contains only a single set of stator coils and it has merely a small number of assembling parts and conventional techniques of fabrication may be applied, the motor is cheap in construction. Furthermore, the motor exhibits an excellent energy efficiency due to only small ohmic losses in the coils.

What is claimed is:

1. A hybrid synchronous motor with a toroidal winding comprising:

a rotor and a stator, the stator having at least one assembly of coaxially displaced ferromagnetic rings, the rings having ferromagnetic cogs both on inner and outer circumferences thereof, and the assembly being provided with a polyphase toroidal coil made of coil segments so that a coil wire is lying between the cogs;

wherein the number of cogs formed on the inner circumference of the stator rings is the same as that of the number of cogs formed on the outer circumference thereof.

2. A hybrid synchronous motor according to claim 1, further comprising a plurality of the stator assemblies and wherein the toroidal coil is formed around all of stator assemblies simultaneously, and wherein the common toroidal coil is wound around or assembled from U-shaped copper parts.

3. The hybrid synchronous motor according to claim 1, wherein the gaps between rotor and stator are filled with a liquid, which improves heat transport from a motor interior and reduces mechanical vibrations.

4. The hybrid synchronous motor according to claim 3, wherein the liquid is a ferromagnetic liquid.

5. A hybrid synchronous motor with a toroidal winding comprising:

a rotor and a stator, the stator having at least one assembly of coaxially displaced ferromagnetic rings, the rings having ferromagnetic cogs both on inner and outer circumferences thereof, and the assembly being provided with a polyphase toroidal coil made of coil segments so that a coil wire is lying between the cogs, wherein the rotor includes one pair of inner and outer rotor assemblies that is mounted to each stator assembly, each rotor assembly including two coaxially displaced rotor rings, each rotor ring being formed with rotor poles in the form of cogs which are equally spaced along a circumferential direction, so that the poles of each of the rotor rings are angularly shifted for one half of a rotor pole division relative to the poles of the other corresponding one of the rotor rings, respectively.

6. The hybrid synchronous motor according to claim 5, wherein either one axially magnetized disk is inserted between the cogged stator rings of each assembly, or two such disks are inserted between the adjacent cogged rotor rings, and wherein the disk or the disks are producing transverse magnetic flux in the inner and in the outer air gaps between the rotor and stator.

7. The hybrid synchronous motor according to claim 5, wherein four sets of rotor poles have the same number of poles, and four sets of stator poles also have the same number of poles, and the number of rotor poles differs from the number of stator poles if the stator poles are equally spaced along a circumferential direction.

* * * * *